United States Patent
Park et al.

(10) Patent No.: US 9,932,026 B2
(45) Date of Patent: Apr. 3, 2018

(54) SHIFT CONTROL METHOD AND APPARATUS FOR VEHICLE

(71) Applicant: HYUNDAI AUTRON CO., LTD., Seongnam-si (KR)

(72) Inventors: Jin-Young Park, Seoul (KR); Jun-Hyung Kim, Anyang-si (KR)

(73) Assignee: Hyundai Autron, Co., Ltd., Seongnam-si (KR)

( * ) Notice: Subject to any disclaimer, the term of this patent is extended or adjusted under 35 U.S.C. 154(b) by 90 days.

(21) Appl. No.: 14/961,240

(22) Filed: Dec. 7, 2015

(65) Prior Publication Data

US 2016/0167660 A1 Jun. 16, 2016

(30) Foreign Application Priority Data

Dec. 15, 2014 (KR) ........................ 10-2014-0180289

(51) Int. Cl.
*B60W 10/10* (2012.01)
*B60W 30/18* (2012.01)
(Continued)

(52) U.S. Cl.
CPC ............ *B60W 10/10* (2013.01); *B60W 10/06* (2013.01); *B60W 30/18018* (2013.01);
(Continued)

(58) Field of Classification Search
CPC ................. B60W 10/06; B60W 10/11; B60W 30/18018; B60W 2510/0638;
(Continued)

(56) References Cited

U.S. PATENT DOCUMENTS 5,079,971 A * 1/1992 Yoshimura .......... F16H 61/0021
477/161
6,584,394 B2 * 6/2003 Takatori .................. F16H 61/08
701/51
(Continued)

FOREIGN PATENT DOCUMENTS

DE 102005013137 A1 9/2006
DE 102006036756 A1 2/2008
(Continued)

*Primary Examiner* — Ramya P Burgess
*Assistant Examiner* — David R Morris
(74) *Attorney, Agent, or Firm* — Baker McKenzie LLP; Hyunho Park

(57) ABSTRACT

A shift control method and apparatus for a vehicle is described. The shift control method for a vehicle having an oil pump includes determining whether the vehicle satisfies an Idle Stop and Go (ISG) learning condition, measuring, when the vehicle satisfies the ISG learning condition, a shift time of a transmission when a driving state of the vehicle is changed from an idling state to a restart state, comparing the measured shift time with a predetermined reference shift time, and adjusting a pressure of oil supplied to a solenoid of the transmission from the oil pump according to the compared result. Thus, it is possible to reduce a variation in shift time required when the ISG vehicle using a mechanical oil pump in place of an electrical oil pump is restarted.

3 Claims, 2 Drawing Sheets

(51) Int. Cl.
*F16H 61/00* (2006.01)
*B60W 10/06* (2006.01)
*B60W 50/00* (2006.01)

(52) U.S. Cl.
CPC . *F16H 61/0025* (2013.01); *B60W 2050/0088* (2013.01); *B60W 2510/0638* (2013.01); *B60W 2510/107* (2013.01); *B60W 2510/108* (2013.01); *B60W 2520/10* (2013.01); *B60W 2710/1083* (2013.01)

(58) Field of Classification Search
CPC ... B60W 2510/108; B60W 2510/0642; B60W 2510/0676; B60W 2510/1075; B60W 2520/10; B60W 2710/1083; B60W 2710/1077
See application file for complete search history.

(56) References Cited

U.S. PATENT DOCUMENTS 7,357,213 B2 * 4/2008 Ji .................. F02N 11/006
 180/305
8,608,620 B2 * 12/2013 Kim ................ B60W 10/06
 477/156
9,067,599 B2 * 6/2015 Van Maanen ........ B60W 20/40

FOREIGN PATENT DOCUMENTS

| | | |
|---|---|---|
| DE | 102013100207 A1 | 9/2013 |
| JP | 2000-035122 A | 2/2000 |
| JP | 2006-170289 A | 6/2006 |

\* cited by examiner

SHIFT CONTROL METHOD AND APPARATUS FOR VEHICLE

CROSS-REFERENCE TO RELATED APPLICATION(S)

This application claims priority to Korean Patent Application No. 10-2014-0180289, filed on Dec. 15, 2014 in the Korean Intellectual Property Office, the disclosure of which is incorporated herein by reference in its entirety.

BACKGROUND OF THE INVENTION

Field of the Invention

The present invention relates to a shift control method and apparatus for a vehicle.

Description of the Related Art

Vehicle companies develop ISG (Idle Stop and Go) vehicles integrated with eco-friendly, high fuel efficiency, idling prevention technologies according to worldwide high oil prices and reinforced environment regulations. Although these technologies are currently applied only to compact vehicles, the application thereof is gradually expanded so that all vehicles have them as basic functions.

In an ISG vehicle, an engine enters an idling state when an ISG mode is operated (when the engine is turned off), the engine is automatically stopped when a predetermined condition is satisfied, and the engine is automatically restarted when a brake pedal is released, or the tip-in of an accelerator pedal or a starting intention according to a change in gear position is detected. In this case, in order to restart the engine of the ISG vehicle, a constant hydraulic pressure is supplied to the solenoid of a transmission by means of an electrical oil pump.

Meanwhile, some of ISG vehicles use mechanical oil pumps in place of electrical oil pumps in order to achieve a reduction in cost, a reduction in weight, and an improvement in fuel efficiency. However, in the ISG vehicle using the mechanical oil pump, since a hydraulic pressure completely falls in a solenoid when an engine is turned off during an ISG mode, it takes a long time to supply the hydraulic pressure to the solenoid by means of the mechanical oil pump when the engine is restarted after it is turned off. For this reason, there is a problem in that a variation in shift time is generated when the engine is restarted.

SUMMARY OF THE INVENTION

Accordingly, the present invention has been made in view of the above-mentioned problem, and an object thereof is to provide a shift control method and apparatus for a vehicle, capable of reducing a variation in shift time when an ISG vehicle using a mechanical oil pump in place of an electrical oil pump is restarted.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the accompanying drawings.

In accordance with an aspect of the present invention, a shift control method for a vehicle having an oil pump includes determining whether or not the vehicle satisfies an ISG learning condition, measuring, when the vehicle satisfies the ISG learning condition, a shift time of a transmission when a driving state of the vehicle is changed from an idling state to a restart state, comparing the measured shift time with a predetermined reference shift time, and adjusting a pressure of oil supplied to a solenoid of the transmission from the oil pump according to the compared result.

In accordance with another aspect of the present invention, a shift control apparatus for a vehicle having an oil pump includes a determination unit for determining whether or not the vehicle satisfies an ISG learning condition, a measurement unit for measuring, when the vehicle satisfies the ISG learning condition, a shift time of a transmission when a driving state of the vehicle is changed from an idling state to a restart state, and a control unit for comparing the measured shift time with a predetermined reference shift time, and adjusting a pressure of oil supplied to a solenoid of the transmission from the oil pump according to the compared result.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EMBODIMENTS

Figure 1:
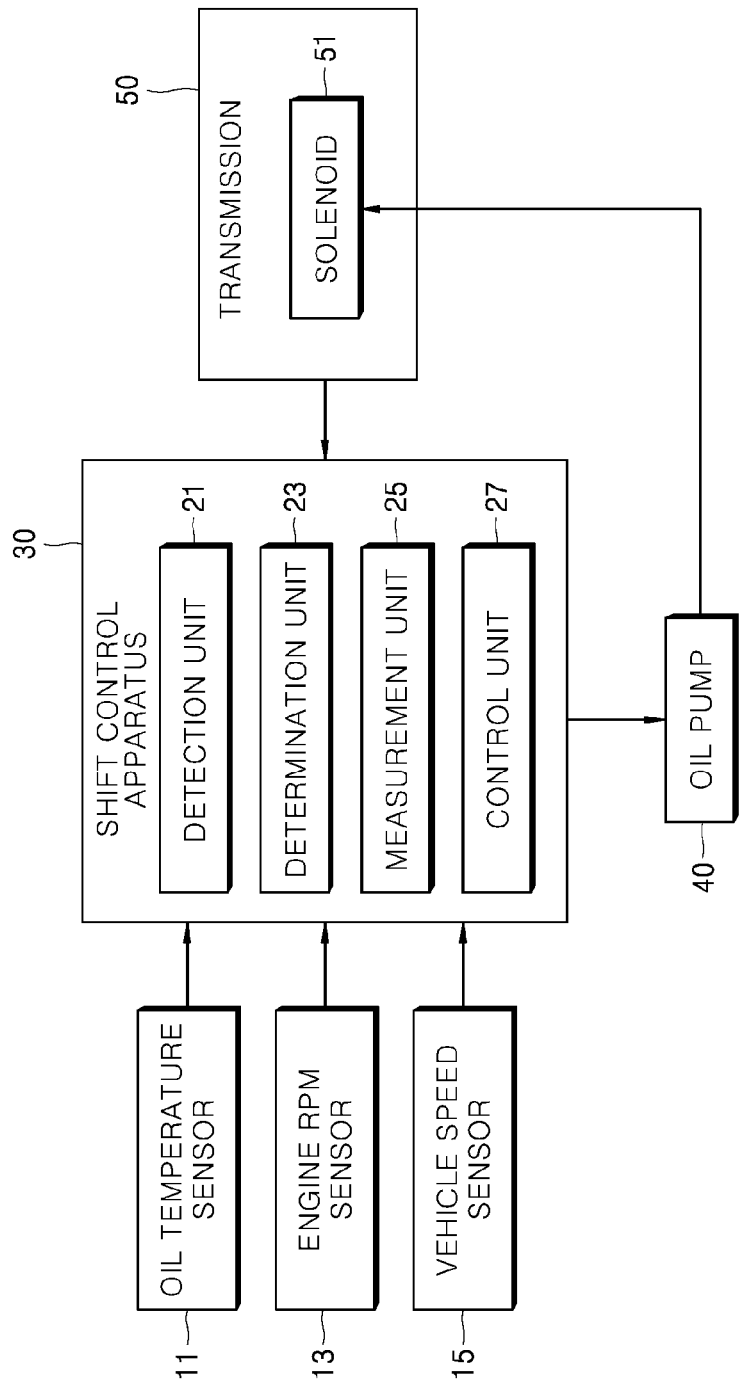
FIG. 1 is a block diagram illustrating a shift control apparatus according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a shift control apparatus according to an embodiment of the present invention.

Referring to FIG. 1, the shift control apparatus, which is designated by reference numeral 30, according to the embodiment of the present invention includes a detection unit 21, a determination unit 23, a measurement unit 25, and a control unit 27. The shift control apparatus 30 may detect whether or not an ISG vehicle is in an idling state using a plurality of sensors 11, 13, and 15, measure a shift time during gear shifting when the ISG vehicle is detected to be in the idling state, and transmit control signals for adjusting the pressure of oil, which is supplied to a solenoid 51 from an oil pump 40, based on the measured shift time, to the oil pump 40. According to the embodiment, the shift control apparatus 30 further includes a storage unit, and the adjusted amount of oil may be stored in the storage unit.

Here, the sensors 11, 13, and 15 include an oil temperature sensor 11, an engine rpm sensor 13, and a vehicle speed sensor 15. In more detail, the oil temperature sensor 11 may detect the oil temperature of the vehicle engine, the engine rpm sensor 13 may detect the engine speed of the vehicle, and vehicle speed sensor 15 may detect the speed of the vehicle.

The oil pump 40 may be a device which supplies oil to the solenoid 51 of a transmission 50 in response to the control signals of the shift control apparatus 30. Here, the oil pump 40 may be a mechanical oil pump.

Hereinafter, the components of the shift control apparatus 30 which adjusts the amount of oil in the oil pump 40 will be described in detail.

The detection unit 21 may detect the oil temperature of the vehicle using the oil temperature sensor 11, the engine speed of the vehicle using the engine rpm sensor 13, and the vehicle speed using the vehicle speed sensor 15.

In this case, the determination unit 23 may determine whether or not the vehicle satisfies an ISG learning condition, based on the oil temperature, engine speed, and vehicle speed detected by the detection unit 21. Here, the ISG learning the shift control apparatus 30 includes a series of operations that detect whether or not the ISG vehicle is in an idling state using the sensors 11, 13, and 15, measure the shift time during gear shifting when the ISG vehicle is detected to be in the idling state, adjust the pressure of oil supplied to the solenoid 51 from the oil pump 40, based on the measured shift time, and store the adjusted amount of oil in the storage unit.

The determination unit 23 may determine whether or not the ISG learning condition is satisfied, and the ISG learning condition is a condition which is indicative of whether or not the oil temperature, engine speed, and vehicle speed detected by the detection unit 21 are within a predetermined reference range. That is, the determination unit 23 may determine that the ISG vehicle is in the idling state when the oil temperature, engine speed, and vehicle speed detected by the detection unit 21 are within the predetermined reference range, and may determine that the ISG vehicle is not in the idling state when the oil temperature, engine speed, and vehicle speed detected by the detection unit 21 are not within the predetermined reference range.

Next, when the determination unit 23 determines that the vehicle satisfies the ISG learning condition, the measurement unit 25 may measure a shift time of the transmission 50 when the driving state of the ISG vehicle is changed from the idling state to a restart state. Here, the shift time may be a time until the transmission 50 begins to shift gears, when a user accelerates the vehicle, and then the gear shifting is completed.

Next, the control unit 27 may compare the shift time measured by the measurement unit 25 with a predetermined reference shift time, and transmit control signals for adjusting the pressure of oil supplied to the solenoid 51 of the transmission 50 from the oil pump 40 according to the compared result.

In more detail, when the shift time measured by the measurement unit 25 is greater than the predetermined reference shift time, the control unit 27 may increase the pressure of oil supplied to the solenoid 51 of the transmission 50 from the oil pump 40. For example, when the shift time measured by the measurement unit 25 is 4 seconds and the predetermined reference shift time is 1 second, the control unit 27 may transmit a control signal for increasing the pressure of oil supplied to the solenoid 51 of the transmission 50 from the oil pump 40 by four times to the oil pump 40.

In addition, when the shift time is equal to or less than the predetermined reference shift time, the control unit 27 may decrease the pressure of oil supplied to the solenoid 51 of the transmission 50 from the oil pump 40. For example, when the shift time is 0.5 seconds and the predetermined reference shift time is 1 second, the control unit 27 may transmit a control signal for decreasing the pressure of oil supplied to the solenoid 51 of the transmission 50 from the oil pump 40 by two times to the oil pump 40.

The control unit 27 may store the increased or decreased pressure of oil supplied to the solenoid 51 of the transmission 50 from the oil pump 40 according to the shift time, i.e. the adjusted amount value of oil, in the storage unit. Next, the control unit 27 may apply the adjusted pressure value of oil stored in the storage unit as the pressure of oil supplied to the solenoid 51 of the transmission 50 from the oil pump 40 during gear shifting.

Meanwhile, the measurement unit 25 may measure a remaining amount of oil left in the solenoid 51 of the transmission 50 when the vehicle is in the idling state.

In this case, the control unit 27 may adjust the pressure of oil supplied to the solenoid 51 of the transmission 50 according to the remaining amount of oil. That is, the control unit 27 may compare the shift time measured by the measurement unit 25 with the predetermined reference shift time, and adjust the pressure of oil supplied to the solenoid 51 of the transmission 50 by a value that reduces the remaining amount of oil left in the solenoid 51 from the amount of oil supplied to the solenoid 51 of the transmission 50 from the oil pump 40 according to the compared result.

Figure 2:
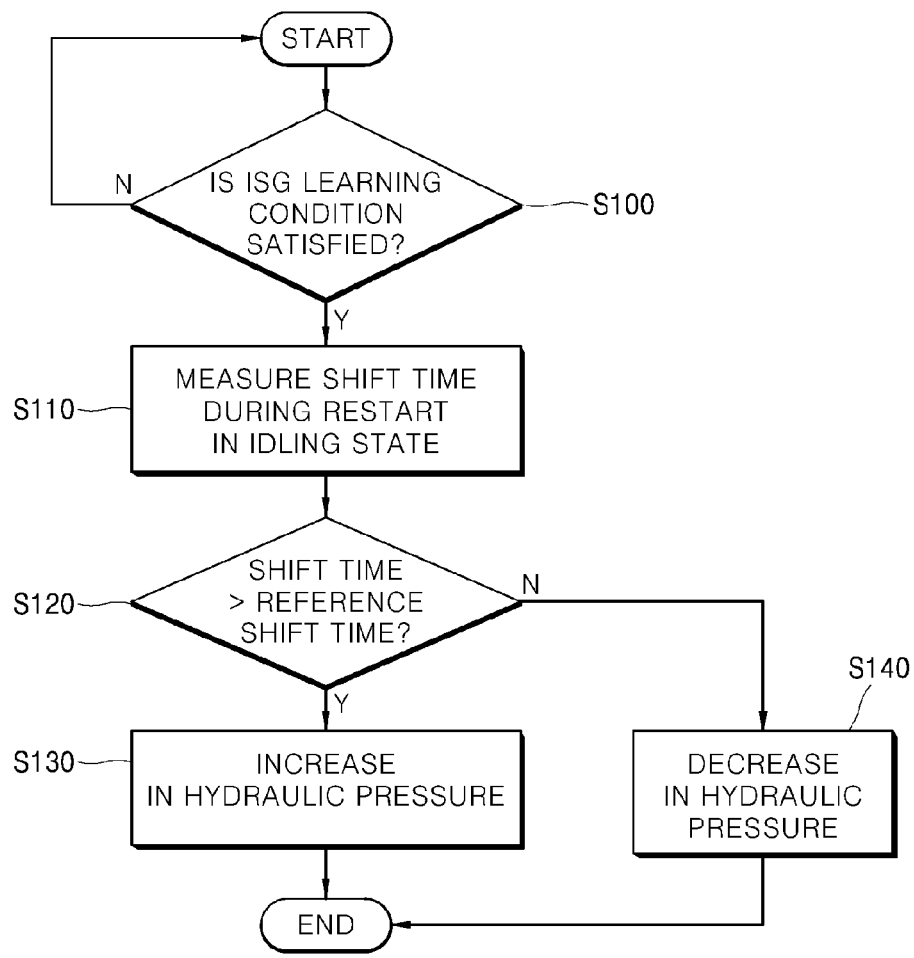
FIG. 2 is a flowchart illustrating a shift control method according to the embodiment of the present invention.

FIG. 2 is a flowchart illustrating a shift control method according to the embodiment of the present invention.

Referring to FIG. 2, the determination unit 23 determines whether or not the vehicle satisfies the ISG learning condition (S100). In more detail, the determination unit 23 may determine whether or not the oil temperature, engine speed, and vehicle speed detected by the detection unit 21 are within the predetermined reference range.

When the determination unit 23 determines that the vehicle satisfies the ISG learning condition, the measurement unit 25 measures the shift time of the transmission 50 when the driving state of the ISG vehicle is changed from the idling state to the restart state (S110).

The control unit 27 compares the shift time measured by the measurement unit 25 with the predetermined reference shift time (S120).

In this case, the control unit 27 adjusts the pressure of oil supplied to the solenoid 51 of the transmission 50 from the oil pump 40 according to the compared result. In more detail, when the shift time is greater than the predetermined reference shift time, the control unit 27 increases the pressure of oil supplied to the solenoid 51 of the transmission 50 from the oil pump 40 (S130). On the other hand, when the shift time is equal to or less than the predetermined reference shift time, the control unit 27 decreases the pressure of oil supplied to the solenoid 51 of the transmission 50 from the oil pump 40 (S140).

The shift control method according to the embodiment of the present invention can reduce the variation in shift time when the ISG vehicle using the mechanical oil pump in place of the electrical oil pump is restarted. Consequently, it is possible to reduce weight and costs compared to when using the electrical oil pump.

As is apparent from the above description, the present invention has an effect of reducing a variation in shift time when an ISG vehicle using a mechanical oil pump in place of an electrical oil pump is restarted.

Although the present invention has been described with respect to the illustrative embodiments, it will be apparent to those skilled in the art that various variations and modifications may be made without departing from the spirit and scope of the invention as defined in the following claims.

What is claimed is:

1. A shift control method for a vehicle having an oil pump, comprising:
    determining whether the vehicle satisfies an Idle Stop and Go (ISG) learning condition;
    measuring, when the vehicle satisfies the ISG learning condition, a shift time of a transmission when an operation state of the transmission is changed so that the driving state of the vehicle is changed from an idling state to a restart state in which the vehicle starts moving;
    comparing the measured shift time with a predetermined reference shift time;
    adjusting a pressure of oil supplied to a solenoid of the transmission from the oil pump according to the compared result,
    wherein the determining whether the vehicle satisfies the ISG learning condition, comprises:
    detecting an oil temperature of the vehicle, an engine speed, and a vehicle speed; and
    determining whether the detected oil temperature, engine speed, and vehicle speed are in a predetermined reference range;
    measuring a remaining amount of oil left in the solenoid when the vehicle is in the idling state; and
    adjusting the pressure of oil supplied to the solenoid according to the remaining amount of oil.

2. The shift control method according to claim 1, wherein the shift time is a time until the transmission begins to shift gears and the gear shifting is completed.

3. The shift control method according to claim 1, wherein the adjusting the pressure of oil comprises:
    increasing the pressure of oil when the shift time is greater than the reference shift time; and
    decreasing the pressure of oil when the shift time is equal to or less than the reference shift time.

* * * * *